3,097,196
Ni COMPLEXES OF MONOAZO COMPOUNDS PREPARED FROM A BENZOTHIAZOLE COMPOUND AND AN α-NAPHTHOL COMPOUND
James M. Straley and John G. Fisher, Kingsport, Tenn., assignors to Eastman Kodak Company, Rochester, N.Y., a corporation of New Jersey
No Drawing. Filed Nov. 12, 1959, Ser. No. 852,226
6 Claims. (Cl. 260—146)

This invention relates to certain metallized and non-metallized benzothiazole azo α-naphthol compounds and their application for the dyeing or coloring of cellulose alkyl carboxylic acid esters having two to four carbon atoms in the acid groups thereof.

More particularly, the azo compounds of the invention are selected from the group consisting of the monoazo compounds having the formula:

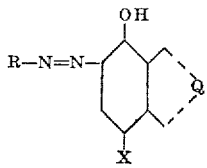

wherein R stands for the radical of a benzothiazole compound free of a water-solubilizing group joined to the azo linkage shown by the carbon atom in its 2-position, X stands for a member selected from the group consisting of lower alkyl and lower alkoxy radicals and wherein Q stands for a member selected from the group consisting of —CH=CH— and —CH$_2$—CH$_2$— and their metal complexes containing a metal selected from the group consisting of cobalt and nickel.

The non-metallized azo compounds of the invention are prepared by diazotizing a 2-aminobenzothiazole compound free of a water-solubilizing group and coupling the diazonium compound obtained with an α-naphthol compound having the formula:

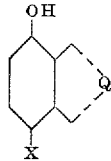

wherein Q and X are as defined hereinbefore. The non-metallized azo compounds can be metallized either on or off the materials they color. Metallization can be carried out, for example, by treating the non-metallized azo compound with a solution or dispersion of the metallizing agent. Although the metal complex is often formed at room temperature, we prefer to accelerate the process by heating for a short period of time. The metallization is effected by procedures well known to those skilled in the art to which this invention is directed.

Nickel chloride, nickel bromide, nickel sulfate, nickel acetate, nickel formate, nickel thiocyanate [Ni(SCN)$_2$], cobaltous bromide, cobaltic chloride, cobaltous chloride, cobaltous acetate and cobalt thiocyanate [Co(SCN)$_2$], for example, are illustrative of the metallizing agents that can be employed.

By cellulose alkyl carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate. The invention will be illustrated primarily with reference to the dyeing or coloration of cellulose acetate because it is the most widely used cellulose alkyl carboxylic acid ester.

The non-metallized azo compounds of the invention dye cellulose alkyl carboxylic acid esters having two to four carbon atoms in the acid groups thereof. After application to these materials, usually in the form of textile materials, the non-metallized azo dye compounds can be metallized thereon. This is the procedure usually employed to color said cellulose alkyl carboxylic acid ester textile materials with the metallized azo compounds of the invention. The non-metallized dyes yield red to violet shades.

Coloration can also be effected by incorporating the non-metallized or metallized compounds into the spinning dope, spinning the fiber as usual and converting the non-metallized azo compounds to their metallized form. Further, the metallizing agent can be incorporated into the spinning dope, the fiber spun as usual and then dyed with the non-metallized monoazo compounds to form the metal complex on the fiber.

When the metal complex is formed on a cellulose alkyl carboxylic acid ester, such as cellulose acetate fiber, the use of a metal thiocyanate appears to be advantageous and is preferred.

The metallized dyeings of the present invention are fast, attractive, bright shades of blue. They have greater fastness to washing than the corresponding non-metallized dyeings and frequently have improved fastness to light.

2-aminobenzothiazole,
2-amino-6-methylsulfonylbenzothiazole,
2-amino-6-ethylsulfonylbenzothiazole,
2-amino-6-n-propylsulfonylbenzothiazole,
2-amino-6-n-butylsulfonylbenzothiazole,
2-aminobenzothiazole-6-N-methylsulfonamide,
2-aminobenzothiazole-6-N-ethylsulfonamide,
2-aminobenzothiazole-6-N-n-propylsulfonamide,
2-aminobenzothiazole-6-N-n-butylsulfonamide,
2-amino-5-methoxybenzothiazole,
2-amino-6-methoxybenzothiazole,
2-amino-6-ethoxybenzothiazole,
2-amino-6-n-propoxybenzothiazole,
2-amino-6-n-butoxybenzothiazole,
2-amino-4-methylbenzothiazole,
2-amino-6-methylbenzothiazole,
2-amino-6-ethylbenzothiazole,
2-amino-6-n-propylbenzothiazole,
2-amino-6-n-butylbenzothiazole,
2-amino-6-β-hydroxyethylbenzothiazole,
2-amino-6-γ-hydroxypropylbenzothiazole,
2-amino-6-δ-hydroxybutylbenzothiazole,
2-amino-6-acetylaminobenzothiazole,
2-amino-6-n-propionylaminobenzothiazole,
2-amino-6-n-butyrylaminobenzothiazole,
2-amino-6-thiomethylbenzothiazole,
2-amino-6-thiocyanobenzothiazole,
2-amino-6-cyanobenzothiazole,
2-amino-6-trifluoromethylbenzothiazole,
2-amino-6-chlorobenzothiazole,
2-amino-4,6-dichlorobenzothiazole,
2-amino-6-nitrobenzothiazole,
2-amino-4,7-dimethoxybenzothiazole,
2-amino-5,6-dimethoxybenzothiazole,
2-amino-4,7-diethoxybenzothiazole,
2-amino-6-β-cyanoethylthiobenzothiazole,
2-amino-6-β-cyano-n-propylthiobenzothiazole,
2-amino-6-γ-cyanopropylthiobenzotihazole,
2-amino-6-β-cyanoethylsulfonylbenzothiazole,
2-amino-6-γ-cyanopropylsulfonylbenzothiazole,
2-amino-6(β,γ-dihydroxypropylthio)benzothiazole,
2-amino-6(β,γ-dihydroxypropylsulfonyl)benzothiazole,
2-amino-6-β-carboxyethylthiobenzothiazole,
2-amino-6-β-carbamylethylthiobenzothiazole,
2-amino-6-β-dimethylcarbamylisopropylthiobenzothiazole and 2-amino-4,6-dimethylbenzothiazole are representative of the 2-aminobenzothiazole compounds used in the preparation of the azo compounds of our invention. Additional suitable 2-aminobenzothiazole compounds are disclosed hereinafter.

The preparation of 2-aminobenzothiazole compounds having the formula:

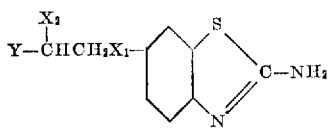

wherein $X_1$ is S or $SO_2$, $X_2$ is hydrogen or methyl, Y is —$CH_2CN$, —COOH, —$COOR_1$, —$CONH_2$,

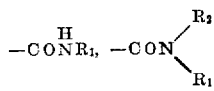

or —CN and $R_1$ is a lower alkyl radical containing from 1 to 4 carbon atoms is described in our copending application Serial No. 652,687, filed April 15, 1957, which issued as U.S. Patent 2,916,482 on December 8, 1959. These compounds, are included among the 2-aminobenzothiazole compounds that can be used in preparing the azo compounds of our invention.

4-methoxy-1-naphthol, 4-ethoxy-1-naphthol, 4-n-propoxy-1-naphthol, 4-isopropoxy-1-naphthol, 4-n-butoxy-1-naphthol, 4-methoxy-5,8-dihydro-1-naphthol, 4-ethoxy-5,8-dihydro-1-naphthol, 4-n-butoxy-5,8-dihydro-1-naphthol, 4-methyl-1-naphthol and 4-methyl-5,8-dihydro-1-naphthol are illustrative of the coupling compounds used in preparing the azo compounds of the invention.

The following examples illustrate the invention.

*Example 1*

9.35 grams of 2-amino-6-β-dimethylcarbamylethylsulfonylbenzothiazole were dissolved in 42 cc. of concentrated sulfuric acid (94%) and 72 cc. of water at 50° C. A solution of 2.16 grams of sodium nitrite in 15 cc. of concentrated sulfuric acid was added, with stirring, at 0–5° C. The reaction mixture was maintained at 0–5° C. for two hours and then added gradually to a solution of 5.22 grams of 4-methoxy-1-naphthol in 150 cc. of propionic-acetic (1:5) acids at 10° C. The mineral acid present was made neutral to Congo red paper with ammonium acetate. The reaction mixture was then allowed to stand at room temperature for two hours after which 1500 cc. of cold water were added. The dye compound which precipitated was recovered by filtration, washed well with cold water and dried. It has the formula:

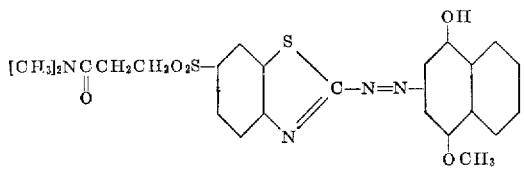

and dyes cellulose acetate red shades.

*Example 2*

A cellulose acetate fabric dyed red with a 1% dyeing (by weight of pure dye) of the dye product of Example 1 was padded with a 2% aqueous solution of nickel thiocyanate under conditions such that a 60 to 100% pick up, based on the weight of the goods, was obtained. The cellulose acetate fabric was air dried and then aged in a steam chest under 10 p.s.i. pressure for 10 minutes after which it was scoured at 60° C. with soap and water, rinsed well with water and dried. The cellulose acetate fabric was dyed a brilliant blue shade having good fastness to light and washing.

When the above example is repeated using a 2% aqueous solution of cobalt thiocyanate in place of the nickel thiocyanate solution a slightly less brilliant and redder blue shade having good fastness to light and washing is obtained.

*Example 3*

2.28 grams of 2-amino-6-methylsulfonylbenzothiazole were dissolved in 24 cc. of water and 14 cc. of concentrated sulfuric acid (94%) and the resulting mixture was cooled to 0° C. A solution of 0.72 gram of $NaNO_2$ in 5 cc. of concentrated $H_2SO_4$ was added, with stirring, at 0–5° C. The reaction mixture was maintained at 0–5° C. for two hours and then added gradually to a solution of 1.78 gram of 4-methoxy-5,8-dihydro-1-naphthol in 100 cc. of propionic-acetic (1:5) acids at 10° C. The reaction mixture was worked up in accordance with the procedure described in Example 1. The dye compound obtained as a solid product dyes cellulose acetate red shades.

*Example 4*

A cellulose acetate fabric dyed red with a 1% dyeing of the dye product of Example 3 was padded with a 2% aqueous solution of nickel thiocyanate in accordance with the procedure described in Example 2. The cellulose acetate fabric was dyed a bright blue shade having good fastness to light and washing.

When the above example is repeated using a 2% aqueous solution of cobalt thiocyanate in place of the nickel thiocyanate solution a bright redder blue shade having good fastness to light and washing is obtained.

*Example 5*

1.5 grams of 2-aminobenzothiazole was diazotised and the diazonium compound obtained was coupled with 2.16 grams of 4-n-butoxy-1-naphthol. Diazotization, coupling and recovery of the dye compound formed were carried out in accordance with the procedure set forth in Example 1. The dye compound obtained dyed cellulose acetate reddish-violet shades.

*Example 6*

1.8 grams of 2-amino-5-methoxybenzothiazole was diazotized and the diazonium compound obtained was coupled with 1.9 grams of 5-hydroxyacenaphthene. Diazotization, coupling and recovery of the dye compound formed were carried out in accordance with the procedure set forth in Example 3. The dye compound obtained dyed cellulose acetate reddish-violet shades.

*Example 7*

1.65 grams of 2-amino-4-methylbenzothiazole was diazotized and the diazonium compound obtained was coupled with 1.58 grams of 4-methyl-1-naphthol. Diazotization, coupling and recovery of the dye compound formed were carried out in accordance with the procedure set forth in Example 3. The dye compound obtained dyed cellulose acetate red shades.

*Example 8*

1.25 grams of the dye compound of Example 1 was refluxed in 16 cc. of acetone and 2.2 cc. of 28% aqueous ammonium hydroxide were added followed by the addition of 0.74 gram of $Ni(OOCCH_3)_2 \cdot 4H_2O$ in 16 cc. of acetone. The resulting solution was refluxed with stirring for 2.5 hours and then poured into 450 cc. of water. The metallized dye product which precipitated was recovered by filtration, washed well with water and dried. About 1.40 grams of a blue pigment was thus obtaind. When this pigment is intimately dispersed (as by grinding) in finely divided condition in a cellulose acetate-acetone dope which is then cast into film or extruded in filaments, brilliant blue products having excellent fastness to light and washing are obtained.

*Example 9*

1.12 grams of the dye compound of Example 3 was refluxed in 16 cc. of acetone and 2.2 cc. of 28% aqueous ammonium hydroxide were added followed by the addition of 0.74 gram of Ni(OOCCH₃)₂·4H₂O in 16 cc. of acetone. The resulting solution was refluxed with stirring for 2.5 hours and then poured into 450 cc. of water. The metallized dye product which precipitated was recovered by filtration, washed well with water and dried. About 1.25 grams of blue pigment was thus obtained. When this pigment is intimately dispersed (as by grinding) in finely divided condition in a cellulose acetate-acetone dope which is then cast into film or extruded in filaments, bright blue products having excellent fastness to light and washing are obtained.

When the dye compounds of Examples 5, 6 and 7 are metallized upon cellulose acetate fabrics with an aqueous nickel thiocyanate solution in accordance with the procedure described in Example 2 bright blue shades having good fastness to light and washing are obtained. When an aqueous solution of cobalt thiocyanate is used as the metallizing agent the metallized dyeings obtained are redder and slightly less bright than those obtained when an aqueous solution of nickel thiocyanate is employed as the metallizing agent.

The non-metallized azo compounds of the invention can be metallized off the fiber in accordance with the procedure set forth in Examples 8 and 9. Any other suitable method of metallizing the non-metallized azo compounds can be employed.

The following tabulation further illustrates the azo compounds of our invention and sets forth (1) the colors the non-metallized azo compounds yield on cellulose acetate and (2) the colors obtained on cellulose acetate when the non-metallized azo compounds are metallized on the fiber with nickel thiocyanate in accordance with the procedure described in Example 2. The coupling component employed in each instance is 4-methoxy-1-naphthol. "CA" refers to cellulose acetate, "Original" refers to the non-metallized dyeing and "Final" refers to the metallized dyeing.

| Diazotized 2-Aminobenzothiazole Compound | Color on CA | |
|---|---|---|
| | Original | Final |
| 6-β-cyanoethylthio | Violet | Blue. |
| 6-β-dimethylcarbamylethylthio | Red-violet | Do. |
| 6-β-cyanopropylthio | Red | Do. |
| 6-β-cyanoethylsulfonyl | Red | Do. |
| 6-cyanomethylthio | Violet | Do. |
| 6-thiocyano | Red-violet | Do. |
| 6-carboxymethylthio | Violet | Do. |
| 4,6-dichloro | Red | Reddish blue. |
| 4,7-dimethoxy | Violet | Blue. |
| 6-carbamylmethylsulfonyl | Red-violet | Do. |
| 6-carbomethoxyethylthio | Violet | Do. |

The non-metallized monoazo dye compounds of our invention can be applied to cellulose alkyl carboxylic acid esters having two to four carbon atoms in the acid groups thereof, textile materials in the form of an aqueous dispersion and are ordinarily so applied.

To illustrate, the non-metallized monoazo dye compound is finely ground with a dispersing agent such as sodium lignin sulfonate, Turkey red oil, soap, or an oleyl glyceryl sulfate and the resulting mixture is dispersed in water. The dye bath thus prepared is heated to a temperature approximately 45° C.–55° C. and the textile material to be dyed is immersed in the dyebath, following which the temperature is gradually raised to 80° C.– 90° C. and maintained at this temperature until dyeing is complete, usually one-half to two hours. From time to time throughout the dyeing operation, the material is worked to promote even dyeing. Upon completion of the dyeing operation, the textile material can be removed from the dye bath, washed with an aqueous soap solution, rinsed well with water and dried.

The expression "propionic-acetic (1:5) acids" refers to a mixture of propionic and acetic acids in which there are five parts by volume of acetic acid to one part by volume of propionic acid.

We claim:
1. The nickel complex of the monoazo compounds having the formula:

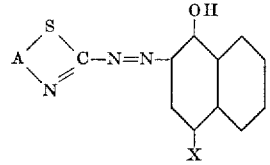

wherein Ar represents an ortho-arylene radical of the benzene series devoid of a water-solubilizing group, and X stands for a member selected from the group consisting of a methyl radical and a lower alkoxy radical.

2. The nickel complex of the azo compound having the formula:

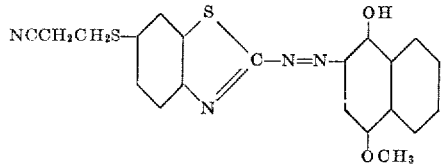

3. The nickel complex of the azo compound having the formula:

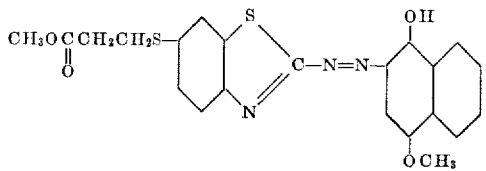

4. The nickel complex of the azo compound having the formula:

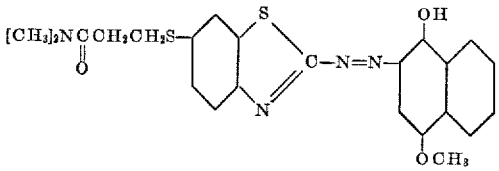

5. The nickel complex of the azo compound having the formula:

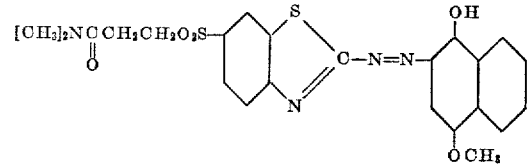

6. The nickel complex of the azo compound having the formula:

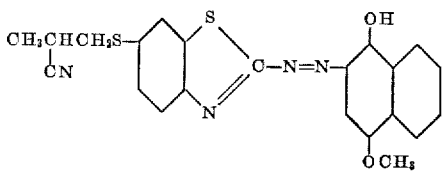

References Cited in the file of this patent
UNITED STATES PATENTS

| 833,605 | Julius | Oct. 16, 1906 |
| 2,868,774 | Straley et al. | Jan. 13, 1959 |
| 2,875,190 | Straley et al. | Feb. 24, 1959 |
| 2,916,482 | Straley et al. | Dec. 8, 1959 |

UNITED STATES PATENT OFFICE
CERTIFICATE OF CORRECTION

Patent No. 3,097,196                                July 9, 1963

James M. Straley et al.

It is hereby certified that error appears in the above numbered patent requiring correction and that the said Letters Patent should read as corrected below.

Column 2, line 65, for "-cyanopropylthiobenzotihazole" read -- -cyanopropylthiobenzothiazole --; column 4, line 66, for "obtaind" read -- obtained --; column 6, lines 7 to 13, the formula should appear as shown below instead of as in the patent:

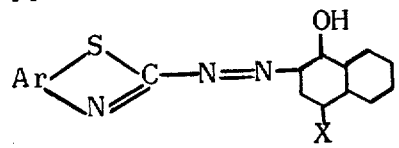

Signed and sealed this 21st day of January 1964.

(SEAL)
Attest:

ERNEST W. SWIDER
Attesting Officer

EDWIN L. REYNOLDS
Commissioner of Patents